UNITED STATES PATENT OFFICE.

CHARLES JULES MERCIER, OF NEUCHATEL, SWITZERLAND.

IMPROVEMENT IN WATER-PROOFED POROUS FABRICS.

Specification forming part of Letters Patent No. 146,353, dated January 13, 1874; application filed October 15, 1872.

*To all whom it may concern:*

Be it known that I, CHARLES J. MERCIER, of Neuchatel, Switzerland, have invented certain Improvements in the Manufacture of Water-Proof Materials, of which the following is a specification:

The object of the present invention is to render water-proof materials, especially such as are employed in the manufacture of clothing, healthy to the wearer, by a system of ventilation. This is effected in the following manner—that is to say, in the course of manufacture of the tissue or substance, a number of apertures are made therein. These are tastefully arranged in any design, and may be made of any desired or suitable form, and so placed as not to mar the uniformity of the garment. These openings are covered with caps of the same material, and tubular in construction, whose diameter at the base exceeds that of the apertures, the object being to cover the holes; while, at the same time, a space or communication is left between the material and the cap to facilitate free ventilation and effectually exclude wet. These caps are furnished or bordered with light steel springs, or other elastic medium, for keeping the openings in proper form for the introduction and circulation of air to the exclusion of wet. Instead of the whole material being covered with the openings and caps, parts of the garments only may be supplied with them, those parts being selected where ventilation is most essential.

I claim as my invention—

The application to water-proof materials, such, for instance, as india-rubber, gutta-percha, silk, or tarpaulin, of the apertures covered by caps, whose diameter at the base exceeds that of the orifices in the material, and connected thereto by light steel springs, or other medium of an elastic nature, and whose object is to keep the apertures in proper form, while, at the same time, a space is left between the two sufficient for the circulation of air and the exclusion of wet, as and for the purpose herein set forth.

CHARLES JULES MERCIER.

Witnesses:
CHAS. H. UPTON,
GORDON GRANT.